Dec. 3, 1940.   B. H. SHOEMAKER   2,223,643
METHOD OF SOLID CATALYST DISPOSAL
Filed Sept. 29, 1938
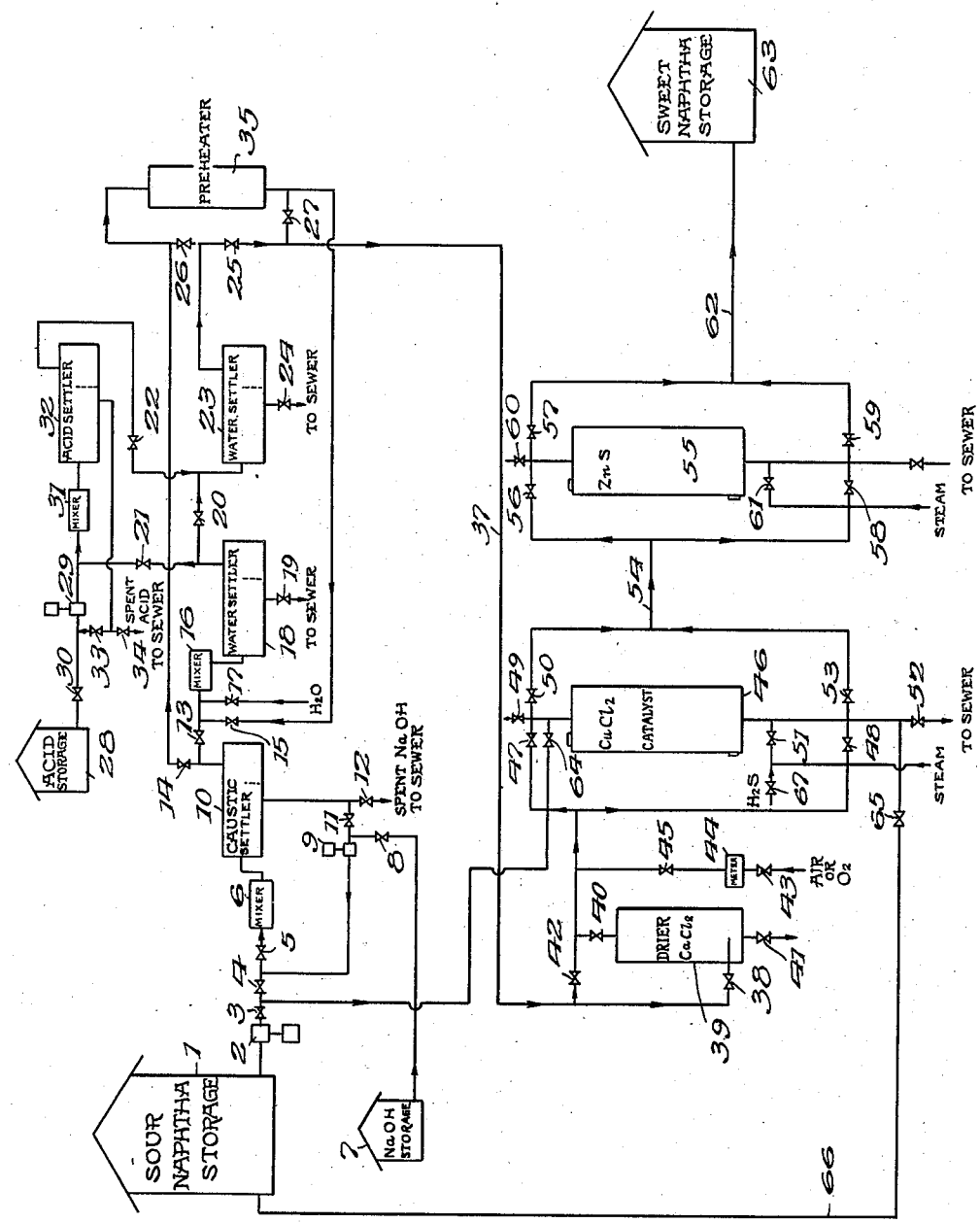
Inventor
*Bernard H. Shoemaker,*
By *Geo. L. Parkhurst*
Attorney Patented Dec. 3, 1940

2,223,643

UNITED STATES PATENT OFFICE 2,223,643

METHOD OF SOLID CATALYST DISPOSAL

Bernard H. Shoemaker, Hammond, Ind., assignor to Standard Oil Company, Chicago, Ill., a corporation of Indiana Application September 29, 1938, Serial No. 232,453

10 Claims. (Cl. 196—30)

This invention relates to the sweetening of petroleum distillates such as gasoline, naphthas, kerosene, oleum spirits, etc., by the use of copper salts and particularly by the use of copper chloride.

Processes of this general type are well known. Such processes utilize as a sweetening reagent either a body of a solution of the copper salt or a so-called dry reagent which comprises copper salt on a carrier such as clay or pumice. My invention particularly relates to processes utilizing the so-called dry type of reagent.

It is an object of my invention to provide improvements in copper chloride sweetening processes. More particularly it is an object of my invention to provide a new and improved method for disposing of spent copper chloride catalysts of the so-called dry type while eliminating fire and corrosion hazards. Other and more detailed objects, advantages and uses of my invention will become apparent as the description thereof proceeds.

Copper chloride reagents of the so-called dry type can be prepared in various ways. In the past they have usually been prepared by subjecting the carrier which can suitably be a clay, for instance Attapulgus clay or other adsorbent material preferably of a granular nature, to a dilute solution of a copper salt which may be, for instance, copper chloride or copper sulfate plus sodium chloride or ammonium chloride which yields a copper chloride type of reagent. The catalyst is then removed from the solution and dried at an elevated temperature to remove excess moisture while leaving in the catalyst an amount of water equal to from about 20% to about 25% of the total weight of the reagent including the adsorbent carrier. The amount of copper present as copper chloride can, for instance, be from about 5% to about 10%.

Non-adsorbent carriers such as pumice can likewise be used to support copper chloride and in this event less water, for instance a total of 5%, is used and the copper salt is applied to the carrier in solid form.

Since the carrier material, particularly in the case of argillaceous carriers, is likely to be alkaline, it is decidedly advantageous to incorporate a small amount of acid, preferably hydrochloric acid, in the copper salt solution applied to the carrier.

Another advantageous method of preparing the so-called dry copper chloride catalyst serves to confine the copper salts as much as possible to the surface of the carrier granules where it is most effective in the sweetening process. This can be done by pretreating an adsorbent carrier with water and then adding a very concentrated, preferably substantially saturated, solution of the copper salt to the carrier so that the final result is a composition containing the desired amount of water but with an increasing copper content towards the surface of the granules.

For instance, fuller's earth, which is a suitable adsorbent carrier, can be pretreated with from about 5% to about 12% its weight of water and copper chloride can then be dissolved in a limited amount of water and the solution mixed with the water-treated fuller's earth. The amount of water used with the copper chloride is such that when added to and mixed with the fuller's earth the catalyst is apparently, although not actually, dry and pours readily. The finished catalyst can desirably be composed of about 71.5% clay, 20.7% water and 7.8% copper chloride. By this method the copper chloride is deeply impregnated into the pores of the clay but at the same time there is a high concentration of the catalyst near the surface of the clay.

The so-called dry copper chloride catalyst prepared by any of these methods or by other methods known to the art is used to sweeten petroleum distillates of the type above mentioned by passing such distillates over the catalyst or otherwise contacting them with the catalyst in the liquid phase at atmospheric or slightly elevated temperatures.

The details of the process as I prefer to carry them out can best be described by reference to the accompanying drawing which is a flow diagram of one embodiment of my invention.

A sour naphtha or other light petroleum distillate to be sweetened is pumped from storage tank 1 by means of pump 2, passes through valves 3, 4 and 5 and is contacted in mixer 6 with a dilute caustic solution, for instance sodium hydroxide solution, which is removed from storage tank 7 through valve 8 by pump 9 and introduced into the sour naphtha stream prior to passing through mixer 6. The mixed materials then proceed to caustic settler 10 where the caustic settles out and is recycled through valve 11 by pump 9 if desired. From time to time or continuously the spent caustic is removed through valved line 12 to the sewer.

It has been found that caustic settler 10 does not necessarily serve to remove the last traces of entrained caustic from the distillate and that any traces of caustic carried over into contact with the copper chloride reagent serves to destroy that reagent. It is therefore very important that the last traces of entrained caustic be removed and this can be done very effectively by water washing, preferably by two successive water washes.

These water washes serve not only to remove the last traces of the entrained caustic but likewise insure that the distillate will be saturated with water so that the moisture content of the catalyst will not be unduly reduced by the passage of the distillate therethrough and so that moisture content can be controlled as will hereinafter appear.

The distillate from caustic settler 10 can be passed through valve 13 (valves 14 and 15 being closed) and thence through mixer 16. In advance of mixer 16 a small amount of wash water is introduced through valved line 17 and this water is settled out in water settler 18 and removed to the sewer periodically or continuously through valved line 19.

In ordinary cases the distillates being sweetened do not contain any substantial amount of nitrogen bases and when this is the case the distillate from water settler 18 passes through valve 20 (valves 21 and 22 being closed) into a second water settler 23 in which the last traces of water are removed through valved line 24 and the washed distillate passes through valve 25 (valves 26 and 27 being closed) into the system shown in the lower half of the flow diagram.

However, where the distillate being sweetened comes from a crude containing substantial quantities of nitrogen bases I find that these must be removed prior to the sweetening reaction. In this event valve 20 is closed and valves 21 and 22 are opened, dilute acid from tank 28 which may, for instance, be sulfuric or preferably hydrochloric acid of from 1 to 10% strength, too weak to remove any of the olefinic constituents of the distillate, is injected by means of pump 29 through valve 30 into the distillate line passing from water settler 18 to mixer 31. The acid and distillate, after mixing, pass to acid settler 32 from which the acid settles out and passes back to pump 29 through valve 33 or passes intermittently or continuously through valved line 34 to the sewer. The distillate from which acid has been settled passes through valve 22 to water settler 23 where any residual acid or water serves to settle out. A trace of acid carried over into the catalyst system is, however, not disadvantageous as is the carrying over of a trace of caustic and this is particularly true in the case of hydrochloric acid.

If the distillate being sweetened is cold, for instance below 60° F., it is desirable to preheat it prior to the sweetening step. Particularly when the catalyst used is supported on an hygroscopic support such as clay, it is desirable to keep the moisture content of the distillate rather low in order to avoid the necessity of too much drying prior to the catalytic sweetening operation and for this reason I prefer that the preheating be carried out after the caustic and water washing steps since in this way the solubility of water in the distillate is kept at a minimum during these steps.

Thus, when preheating is desired valve 25 is closed and valves 26 and 27 are opened (valves 14 and 15 being, of course, closed) and the distillate then passes through preheater 35 and thence out through valve 27 and line 37 to the apparatus shown in the lower half of the flow diagram.

However, if preheating is desired and a catalyst is used which requires a high moisture content in the stock, which is the case, for instance, when a non-hygroscopic support such as pumice is used, it is sometimes desirable to carry out the preheating step to bring the stock up to about normal room temperature prior to the water washing in order to increase the amount of dissolved water. This can be accomplished by opening valves 14 and 15 and closing valves 13, 26 and 27. The course of the distillate from caustic settler 10 is then first through preheater 35 via valve 14, thence through water settlers 18 and 23 via valve 15 and thence to line 37 via valve 25.

In any event the washed distillate passes through line 37 to the equipment shown in the lower half of the flow diagram and almost invariably it is found that this distillate has too high a water content for optimum sweetening results. In fact it is definitely advantageous that this water content be higher than the optimum since the process can be controlled far better by removing water than by endeavoring to control the addition of small amounts of water in the form of steam or otherwise.

The desired water content can be determined by virtue of the fact that when the water content drops too low the catalyst fails to sweeten while when the water content becomes too high a trace of copper compounds is taken over into the distillate and can be detected by chemical tests.

Thus the distillate, containing some dissolved water, passing through line 37 can be sent through valve 38, drier 39 and valve 40 before being subjected to the catalyst. This drying tower can contain any desired drying agent but I prefer to use calcium chloride. Occasionally calcium chloride solution is removed through valved line 41 and at long intervals it is necessary to replenish the supply of calcium chloride.

However, it is definitely disadvantageous to dry all of the material passing to the catalyst since, as previously described, this results in the catalyst becoming so dry that it fails to sweeten. Thus I provide valved bypass line 42 and on either a continuous or intermittent basis I pass part of the washed distillate containing dissolved water through drying tower 39 and part of it through valved line 42. By this system of saturating the distillate with water and then drying a controlled portion of the distillate, I find that the optimum moisture content can readily be maintained and that the operation can be controlled to give very long catalyst runs. The system is much simpler and much more accurately controllable than a system in which the catalyst is intermittently blown with steam to increase its moisture content or with warm air to decrease its moisture content. Moreover, the necessity of interrupting operations to adjust the catalyst moisture content is avoided and corrosion and explosion hazards incident to the use of steam and air, respectively, are avoided.

Air or oxygen is introduced into the system through valve 43, meter 44 and valve 45 in controlled amount as is known to the art and the distillate containing some dissolved moisture as well as dissolved oxygen passes either into the top of catalyst tower 46 through valve 47 or into the bottom of this tower through valve 48. Catalyst tower 46 contains, of course, the "dry" copper chloride type of reagent prepared by any of the methods above mentioned. Either downflow through the catalyst bed or upflow therethrough can be used although I prefer to use downflow. When operating in this manner valves 48 to 52 are closed and the distillate passes through valve 47 downward through catalyst tower 46 and out through valve 53 and line 54. On the other hand, if upflow is preferred valves 47, 49, 51, 52 and 53 are closed and the catalyst flows through valves 48 and 50 and ultimately to line 54.

In either event the distillate can if desired be treated with a sulfide, for instance an alkali sulfide solution or a material such as zinc sulfide adsorbed on a carrier to remove any traces of copper compounds which may be picked up by the distillate and which may serve to promote the formation of gum therein. As shown, a tower 55 which may contain zinc sulfide adsorbed on clay is utilized and the sweetened distillate can be passed through this tower either upflow or downflow by control valves 56 to 59 (valves 60 and 61 being closed during the operation). From zinc sulfide tower 55 the product passes through line 62 to storage tank 63.

While the so-called dry copper chloride catalyst can be used to give very long runs it eventually becomes spent and must be removed and replaced. This represents a difficult problem since when a run is completed the catalyst contains very large quantities of adsorbed petroleum distillate of a highly flammable nature. Thus the catalyst cannot safely be dumped since the dumping of a large quantity of catalyst soaked with naphtha or the like would be extremely hazardous. The normal method of dealing with this type of problem in the petroleum industry would be to blow the catalyst for a prolonged period with steam to remove the petroleum distillate and thereafter it could safely be dumped and disposed of. However, in the present case blowing with steam serves to hydrolyze the remaining copper chloride yielding hydrochloric acid which is, of course, highly corrosive under the wet, high temperature conditions which would then prevail. In order to prevent this corrosion extremely expensive materials of construction would have to be used.

Another simple way of removing the petroleum distillate before dumping the catalyst would be to blow it with air but this likewise can not be done with safety because of the fire and explosion hazard.

I have solved this problem by first destroying the spent copper chloride catalyst, which is useless in any event, and then steaming out the hydrocarbon materials. Thereafter the catalyst can safely be dumped and disposed of.

To destroy the catalyst I can, for instance, close valve 4 and pass a portion of the sour naphtha through pump 2 and valves 3 and 64 into catalyst chamber 46 (valves 47 to 53 being closed), thence out through valve 65 and back to sour naphtha storage tank 1 through line 66. Since this sour naphtha contains hydrogen sulfide the passage of it through the catalyst bed without caustic washing converts any residual copper chloride to copper sulfide. Thereafter steam can be introduced through valved line 51 and vented through valved line 49 (valves 47, 48, 50, 52, 53 and 65 being closed) and the catalyst is then ready to be dumped.

Alternatively some other source of hydrogen sulfide can be used and this can be injected through valved line 67 and vented through valved line 49. For instance, cracking still gases rich in hydrogen sulfide are suitable.

A still further method of destroying the spent catalyst prior to steaming is to pass caustic from tank 7 through valve 8 (valves 3, 5 and 11 being closed), pump 9 and valves 4 and 64 into catalyst chamber 46 and thence through valve 52 (valves 47 to 51, 53 and 65 being closed) to the sewer. Instead of using fresh caustic from tank 7, spent caustic can be used equally well since either sodium hydroxide or sodium sulfide will convert the copper to an insoluble compound which can be steamed without serious corrosion problems. Thus spent caustic can be cycled through valve 11, pump 9, and valves 4 and 64 to the catalyst chamber, valves 3, 5, 8 and 12 being closed.

Similarly the remaining copper chloride can be converted to copper carbonate by the use of sodium carbonate and still other reagents can be used to convert the copper into compounds which can be steamed without corrosion.

In any of these ways the copper chloride is first destroyed, the flammable hydrocarbons are removed by steam and the catalyst is put in disposable condition.

These methods of handling a catalyst or treating reagent are, of course, applicable to any hydrolyzable salt of a strong acid or other material which forms an acid on steaming.

When the zinc sulfide catalyst in tower 55 needs to be disposed of it can be steamed directly by introducing steam from valved line 61 and venting it through valved line 60, and the other valves associated with this tower being closed.

The spent caustic from valved line 12 can be used to neutralize the acid from valved line 34 and recover nitrogen bases therefrom.

While I have described my invention in connection with certain specific embodiments thereof, it is to be understood that these are by way of illustration and not by way of limitation and I do not intend to be limited thereby but only to the scope of the appended claims which should be construed as broadly as the prior art will permit.

I claim:

1. In the method of disposing of a body of catalyst containing a hydrolyzable ingredient which forms a strong acid on treatment with steam, and soaked with a volatile flammable material in which the volatile flammable material is removed by steaming, the improvement which comprises treating said body of catalyst with a chemical reagent adapted to convert the hydrolyzable ingredient into a different chemical substance which does not form a strong acid on treatment with steam, blowing said body of catalyst with steam to remove the volatile flammable material therefrom and then disposing of said body of catalyst.

2. In the method of removing by steaming volatile hydrocarbon oils from a solid hydrocarbon treating reagent containing a readily hydrolyzable salt of a strong acid, the improvement which comprises successively treating said solid hydrocarbon treating reagent chemically to convert said readily hydrolyzable salt into a compound which does not form a strong acid on treatment with steam, steaming said solid hydrocarbon treating reagent to remove the volatile hydrocarbon oils therefrom and then disposing of said solid hydrocarbon treating reagent.

3. A method of disposing of a solid copper chloride catalyst carrying adsorbed hydrocarbons, which comprises chemically treating said catalyst with a reagent capable of converting said copper chloride into a copper compound which does not yield a strong acid on hydrolysis and then steaming said reagent to remove said hydrocarbons.

4. A method according to claim 3 in which said copper chloride catalyst is treated chemically with a sulfide capable of converting said copper chloride into a copper compound which does not yield a strong acid on hydrolysis.

5. A method according to claim 3 in which said copper chloride catalyst is treated chemically with an hydroxide capable of converting said copper chloride into a copper compound which does not yield a strong acid on hydrolysis.

6. A method according to claim 3 in which said copper chloride catalyst is treated chemically with a carbonate capable of converting said copper chloride into a copper compound which does not yield a strong acid on hydrolysis.

7. A method according to claim 3 in which said copper chloride catalyst is treated chemically with a hydrocarbon material containing hydrogen sulfide.

8. A method according to claim 3 in which said copper chloride catalyst is treated chemically with caustic alkali.

9. A method according to claim 3 in which said copper chloride catalyst is treated chemically with spent caustic alkali previously used to remove hydrogen sulfide.

10. A method of disposing of a body of so-called dry copper chloride reagent used to sweeten a sour naphtha containing hydrogen sulfide by a process in which said hydrogen sulfide is normally removed from said sour naphtha by treatment with caustic alkali prior to subjecting said sour naphtha to said dry copper chloride reagent, the improvement which comprises destroying the spent catalyst by passing a portion of said sour naphtha directly to said catalyst without treatment with caustic alkali and then steaming said catalyst to remove hydrocarbons therefrom in order to render said catalyst more safely and readily disposable.

BERNARD H. SHOEMAKER.